UNITED STATES PATENT OFFICE.

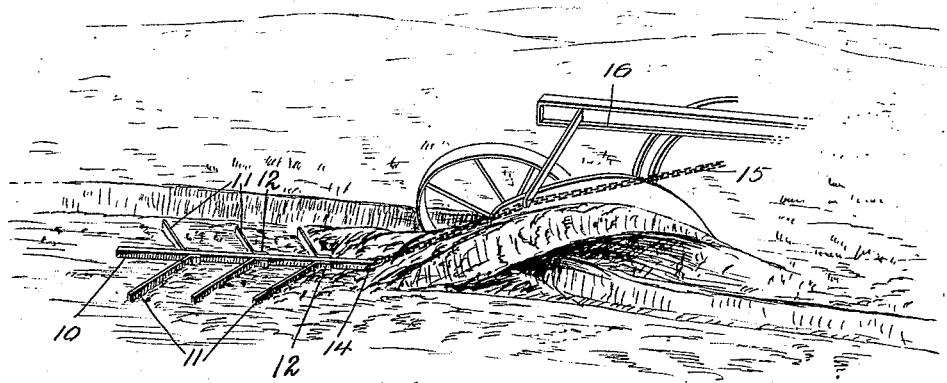
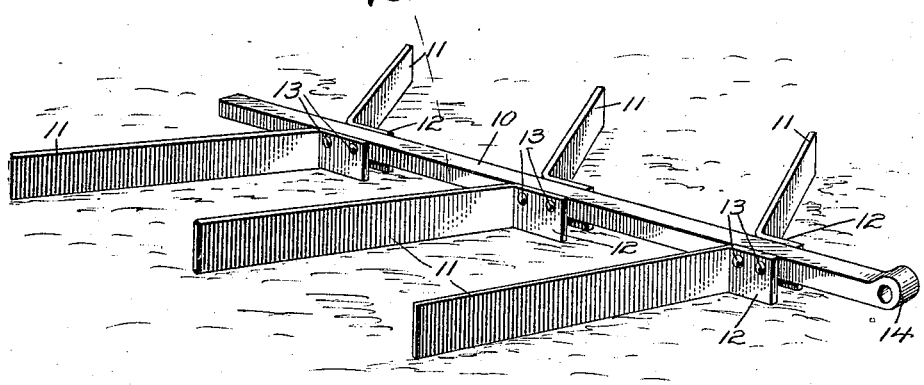
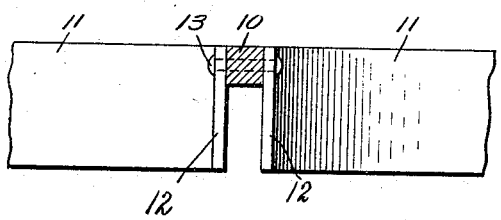

CLAIRE C. HOOD, OF DORE, NORTH DAKOTA.

CLOD CRUSHER.

1,418,260. Specification of Letters Patent. Patented May 30, 1922.

Application filed June 22, 1920. Serial No. 390,693.

*To all whom it may concern:*

Be it known that I, CLAIRE C. HOOD, a citizen of the United States, residing at Dore, in the county of McKenzie and State of North Dakota, have invented certain new and useful Improvements in a Clod Crusher, of which the following is a specification.

This invention relates to earth pulverizing attachments to plows, harrows and the like, and has for one of its objects to simplify and improve the construction and increase the efficiency and utility of devices of this character.

Another object of the invention is to provide a device of this character having means whereby the clods and tufts of grass and sod which are capable of being crushed and pulverized are so treated and clods and tufts which will not yield to the action of the crusher are moved laterally and covered by the earth overturned by the plows or other furrow openers.

With these and other objects in view, the invention consists in certain novel features of construction as hereinafter shown and described and then specifically pointed out in the claim, and in the drawings illustrative of the preferred embodiment of the invention.

Figure 1 is a perspective view of the improved implement attached to a plow,

Fig. 2 is an enlarged perspective view of the improved implement,

Fig. 3 is an enlarged sectional detail.

The improved device comprises a body or rail 10 and a plurality of earth engaging blades 11 each having one end 12 directed obliquely thereto and attached as by rivets 13 to opposite sides of the rail member, as shown. The blades are thus disposed reversely oblique to the body 10 and extend in opposite directions therefrom toward the rear.

The blades are of greater width vertically than the body 10 and being attached thereto with their upper edges flush with the upper face of the body extend for a considerable distance below the lower face of the body. Thus the lower edges of the blades only engage the earth which they effectually pulverize, and crush the clods and tufts and levels the ground and disposes it in condition to receive the seeds and plants.

The body 10 is formed with a perforated forward end 14 to receive a draft chain 15 or the like by which the implement may be coupled to a plow, represented at 16, or other suitable device by which the improved attachment may be drawn over the ground.

When employed in connection with a gang plow the blades 11 will be of greater length than when the implement is employed in connection with a sulky plow.

The preferred embodiment of the invention is disclosed in the drawings and set forth in the specification, but it will be understood that any modifications within the scope of the claim may be made in the construction without departing from the principle of the invention or sacrificing any of its advantages.

What I claim is:

An implement of the class described comprising a central supporting member adapted to be coupled at one end to a moving apparatus, and a plurality of earth engaging blades of greater vertical width than the supporting member and having their inner portions directed forwardly in parallel relation to the supporting member and attached thereby to opposite sides of the same and extending in rearwardly and reversely oblique direction from the supporting member with the earth engaging edges of the blades extending below the lower lines of the supporting member.

In testimony whereof, I affix my signature hereto.

CLAIRE C. HOOD.